United States Patent
Bode et al.

[19]

[11] Patent Number: 6,122,990
[45] Date of Patent: Sep. 26, 2000

[54] HAND BRAKE FOR MOTOR VEHICLES

[75] Inventors: Sven Bode; Wolfgang Kopittke, both of Remscheid, Germany

[73] Assignee: ED. Scharwächter GmbH, Remscheid, Germany

[21] Appl. No.: 09/189,660

[22] Filed: Nov. 10, 1998

[30] Foreign Application Priority Data

Nov. 10, 1997 [DE] Germany .................... 197 49 551

[51] Int. Cl.⁷ .............. G05G 1/04; G05G 5/06; F16C 1/10
[52] U.S. Cl. ............... 74/535; 74/523; 74/528; 74/575; 74/577 M; 74/538; 74/524; 74/501.6; 74/500.5
[58] Field of Search ............ 74/523–526, 535–538, 74/575–578, 557, 501.5 R, 502, 512, 516, 540, 541

[56] References Cited

U.S. PATENT DOCUMENTS

| | | | |
|---|---|---|---|
| 5,001,942 | 3/1991 | Boyer | 74/535 |
| 5,272,935 | 12/1993 | Heinemann et al. | 74/523 |
| 5,448,928 | 9/1995 | Harger | 74/512 X |
| 5,609,066 | 3/1997 | Bunker et al. | 74/537 |
| 5,950,496 | 9/1999 | Rampp | 74/538 |

FOREIGN PATENT DOCUMENTS

| | | | |
|---|---|---|---|
| 0933271 A2 | 11/1998 | European Pat. Off. | 74/523 |
| 2757584 | 6/1998 | France | 74/523 |

*Primary Examiner*—Vinh T. Luong
*Attorney, Agent, or Firm*—Brown & Wood, LLP

[57] ABSTRACT

A hand brake for motor vehicles, and including a trestle provided with a toothing, a brake lever pivotally supported on the trestle, a locking pawl for retaining the brake lever on the trestle in an arbitrary selected pull position, at least one brake cable, a spring-biased tensioning element for the brake cable supported on the trestle, and a spring-biased arrangement for connecting the brake lever with the tensioning element, with the tensioning element being formed as a tooth segment or a tooth wheel which is constantly form-lockingly connected with the brake lever and a brake cable connector associated with the trestle.

8 Claims, 3 Drawing Sheets

HAND BRAKE FOR MOTOR VEHICLES

BACKGROUND OF THE INVENTION

1. Field of the Invention

The present invention relates to a hand brake for motor vehicles and including a trestle provided with a toothing, a brake lever pivotally supported on the trestle, a locking paine element for retaining the brake lever on the trestle in an arbitrary selected pull position, at least one brake cable, a gripping element for the brake cable supported on the trestle, an adjusting spring for applying a biasing force to the gripping element in a rotational direction, a coupling for connecting the brake lever with the gripping element, and a spring for applying a biasing force to the coupling.

2. Description of the Prior Art

Hand brakes of the type described above are characterized in that the brake cable leading to a wheel braking element is connected to a disc segment with a circumferential toothing which serves as an adjusting disc. The adjusting disc is arranged concentrically with the brake lever. The adjusting disc is biased in a rotational direction by an adjusting spring which is formed as a helical spring. The adjusting disc is connected with the brake lever by a drive pawl which is spring-biased, in particular by a coil spring, in a return direction. The drive pawl, upon actuation of the brake lever from its release position, connects the brake lever with the adjusting disc, causing pulling of the brake cable. The drive pawl is formed in this case (see, e.g., European Publication EP-0 535 131) as a rocker one arm of which cooperates with the circumferential toothing of the disc segment which forms the adjusting disc, and the other arm of which cooperates with a reset stop fixedly mounted on the trestle which is fixedly connected with the vehicle body. With such a rocker, upon complete return of the hand brake lever into its release position, the connection of the brake lever with the adjusting disc is broken, and only the biasing force of the adjusting spring acts on the adjusting disc.

The hand brakes with an adjusting device of the above-described type are characterized in that the connection of the brake lever with the cable disc or a comparative gripping element for at least one cable is effected by a ratchet-type locking element, in particular, by a spring-biased pawl, which leads to generation of an undesirable noise upon actuation of the hand brake. In addition, the manufacturing costs of such hand brake are relatively high because only relatively small manufacturing tolerances are allowed.

Accordingly, an object of the present invention is a hand brake of the above-described type provided with adjusting means which would insure a stepless and, thereby, noiseless actuation of the hand brake, without increase of manufacturing and assembly costs.

SUMMARY OF THE INVENTION

This and other objects of the present invention, which will become apparent hereinafter, are achieved by forming the gripping element as a tooth segment or a tooth wheel which is constantly form-lockingly connected with the brake lever and a connector for the brake cable which is mounted on the trestle.

Forming the gripping element as a tooth segment or a tooth wheel permits to form the engageable with each others elements, which are connected to the brake lever, on one hand, and with the brake cable, on the other hand, as toothed elongate elements or as elements with circumferential toothing, whereby a constructional condition for a permanent formlocking engagement of the gripping element with the connections associated with both the brake lever and the brake cable is insured. The permanent form a locking connection of the gripping element with the connection elements of the brake lever and the brake cable permits to form the engageable each other elements as a pinion and a tooth wheel capable of being rotated relative to each other and of being blocked against rotation. This insures a stepless actuation of the hand brake and a stepless locking of the hand brake, i.e., braking or locking of the pinion results in a stepless, rigid engagement of the pinion or the pinion carrier with the tooth segment or the tooth wheel. Thus, the present invention insures an economical manufacturing of hand brakes which are characterized by a stepless and a particularly noiseless operation.

According to an advantageous embodiment of the present invention the pinion is supported on the brake lever and provides for rigid connection of the tooth segment or the tooth wheel with the brake lever. There is further provided steplessly operating blocking means which cooperates with the pinion dependent on pivotal movement of the brake lever to for positive connection of the tooth segment or tooth wheel with the brake lever.

According to a further preferred embodiment of the present invention, it is advantageously contemplated to form the brake cable connector as a tooth rack loosely arranged in a body pan which is engaged with the gripping element from beneath in an approximately overlapping relationship.

According to a particularly preferred embodiment of a stepless actuated hand brake according to the present invention, a peg is secured on the trestle and provides for a rotational movement of the pinion upon a pivotal movement of the trestle. The blocking means comprises a wrap spring supported on a roller connected with the pinion for joint rotation therewith. The wrap spring has one of its radial projections clampingly attached to the brake lever and has another of its radial projections cooperating with the peg which, upon the rotational movement of the trestle, lifts the another radial projection of the wrap spring causing rotational movement of the pinion.

According to a further development of the present invention, the tooth rack has a sidewisely extending projection to which at least one brake cable is connected. The gripping element-forming tooth rack can have two brake cables connected therewith. In the case when two brake cables are connected to the gripping element-forming tooth rack, it is formed as a distributor. According to a still further development of the present invention, in particular when the tooth rack serves for attachment of both brake cables, the tooth rack can be supported in the body pan with a possibility of pivotal movement about a vertical axis in predetermined angular region, in particular, in an angular region of approximately 15°. It is to be pointed out that the sidewisely extending projection for attachment of the brake cable likewise rotates, together with the gripping element-forming tooth rack about the vertical axis.

According to a further development of the invention, the body pan, which supports the gripping element, forms a support for the trestle, connecting the trestle with the vehicle body.

According to a yet further development of the present invention, the adjusting spring is formed as a helical spring supported against the brake lever. One end of the helical spring engages the tooth segment or the tooth wheel which includes a transversely extending peg which is engaged by the end of the helical spring.

BRIEF DESCRIPTION OF THE DRAWINGS

The features and objects of the present invention will become more apparent, and the invention itself will be best understood from the following detailed description for the preferred embodiments when read with reference to the accompanying drawings, wherein.

DETAILED DESCRIPTION OF THE PREFERRED EMBODIMENT

Figure 1:
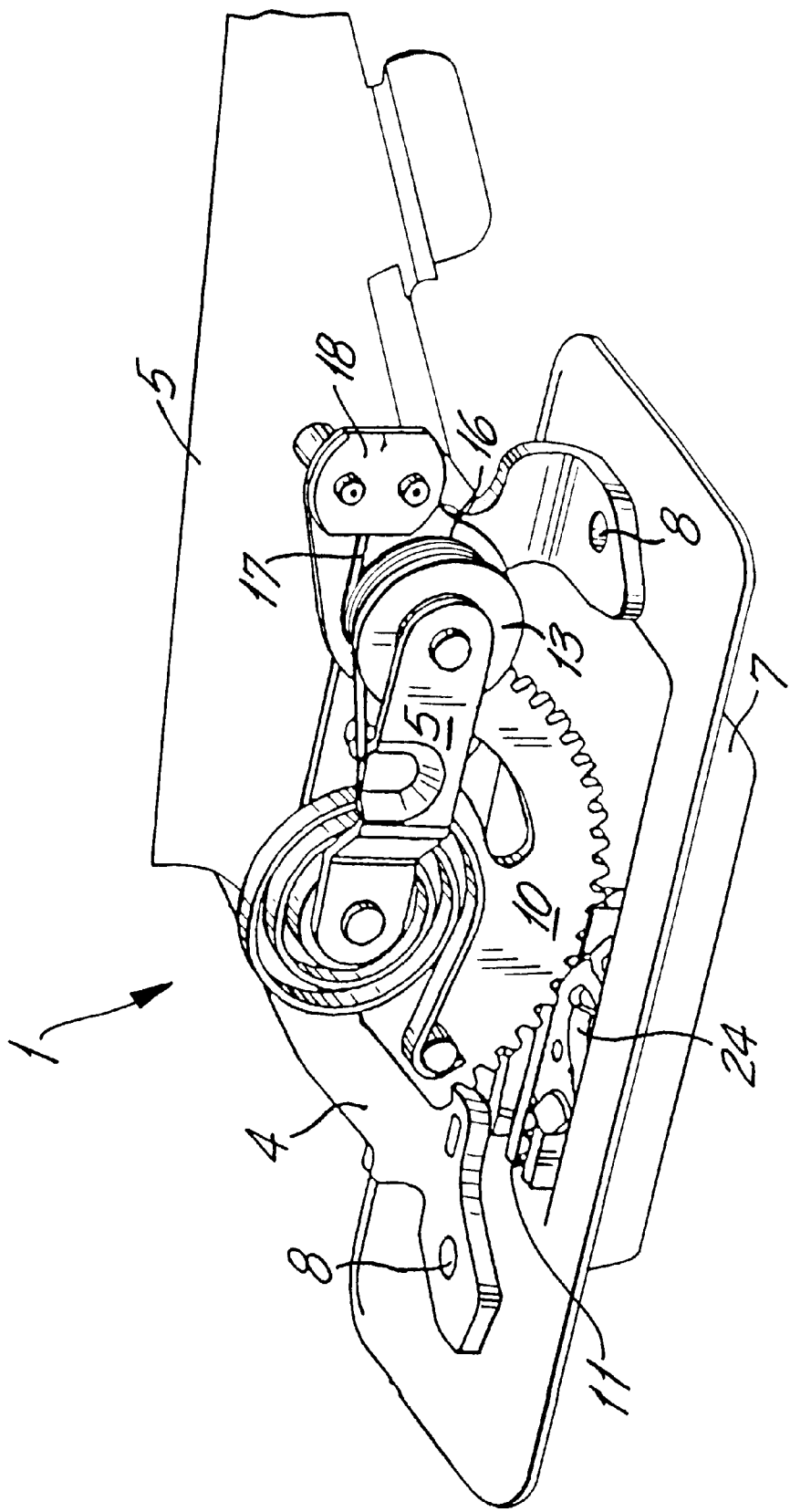
FIG. 1 shows a perspective view of an automatically adjustable hand brake for motor vehicles according to the present invention, viewed from the driver's side.
Figure 3:
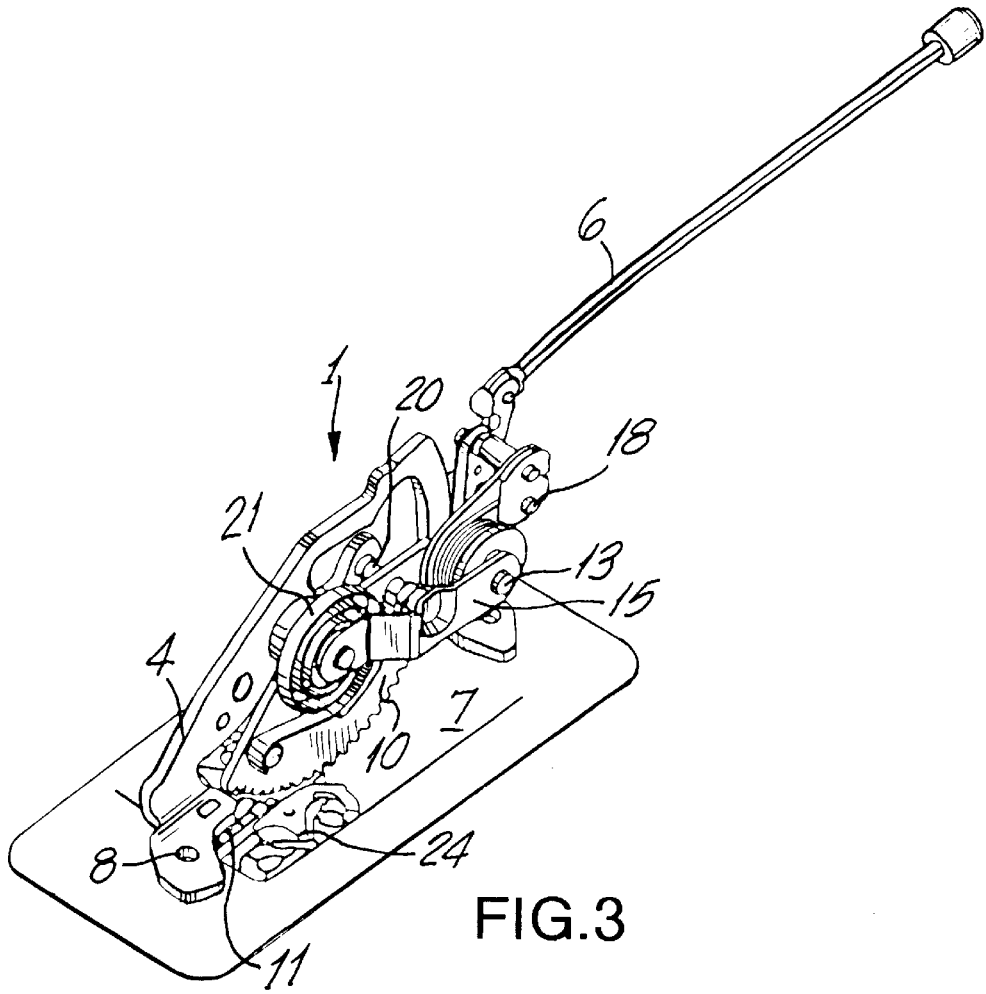
FIG. 3 shows a perspective view of the hand brake without the hand brake lever, viewed from a front passenger side.
Figure 2:
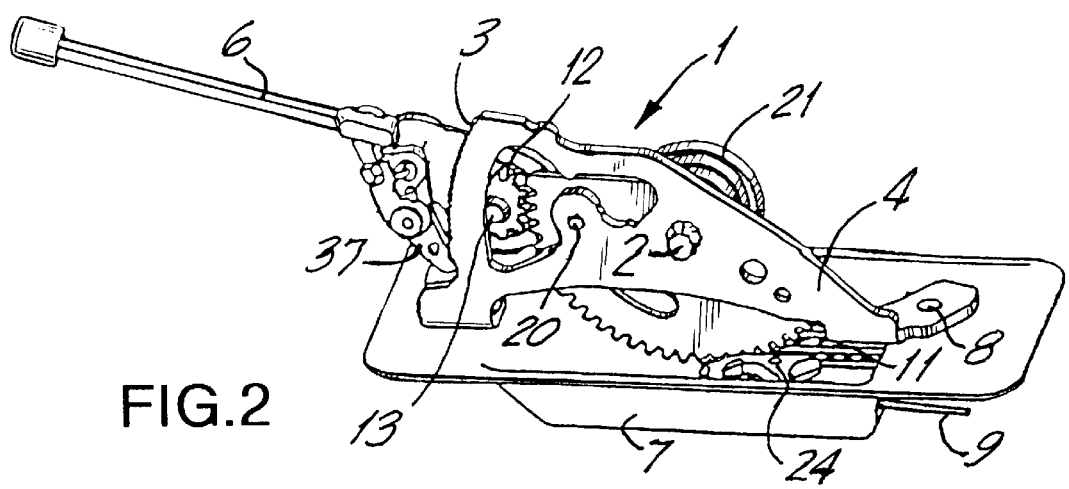
FIG. 2 shows a perspective view of the hand brake without the hand brake lever, also viewed from the driver's side.

A hand brake with an automatically adjustable means for motor vehicles according to the present invention is generally designated in FIGS. 1 and 2 with a reference numeral 1. The hand brake 1 essentially includes a brake lever 5 which is supported on a trestle 4, which is provided with a radially extending toothing 3, for rotation about a horizontal axis 2. The brake lever 5 is fixedly secured on the trestle 4 in any arbitrary selected pull position with locking pawl 37. The hand brake lever 5 is actuated with an actuating handle 6 that carries pawl 37, as shown in FIG. 2. The trestle 4 is screwed to a body pan 7 with screw bolts 8. A tooth segment 10, which forms part of a driving device for at least one brake cable 9, is supported for rotation on the axle 2 which is formed by a bolt. The tooth segment 10 ia adapted to rotate together with the brake lever 5 and independently therefrom. The tooth segment 10 is permanently engaged, in a comb-like manner, with a tooth rack 11, which forms a connector for the brake cable 9, on one hand, and with a pinion 12, on the other hand. The pinion 12 is connected with a roller 14 for joint rotation therewith by an axle journal 13 which provides for the support of the pinion 12 on the brake lever 5. A wrap spring 15 locks the roller 15 relative to the brake lever 5, with loops 16 of the wrap spring 15 being wound about the roller 14. The wrap spring 15 is connected with the hand brake 5 by a first projection 17 and a clamping plate 18. The second projection 19 of the wrap spring 15 cooperates with a peg 20 fixedly secured on the trestle 4. The peg 20 acts as a lifting member. As soon as the brake lever 5 moves out of its position corresponding to the hand brake release position, the peg 20 lifts the projection 19 of the wrap spring 15 which causes the rotation of the roller 14, together with the pinion 12. A helical spring 21 applies a biasing force to the tooth segment 10 which also provides for tensioning of the brake cable 9. The helical spring 21 is supported against the brake lever 5, on one hand, and is supported on a peg 22, which extends transverse to brake lever 5, on the other hand. The peg 22 is engaged by a freely rotatable tooth segment 10 in the rest position of the brake lever 5. As a result of this arrangement, the brake cable 9 is always held play-free, independent of the wear of the brake lining, cable lengths and the like. On the other hand, the tooth segment 10 is constantly engaged with the tooth rack 11.

Figure 5:
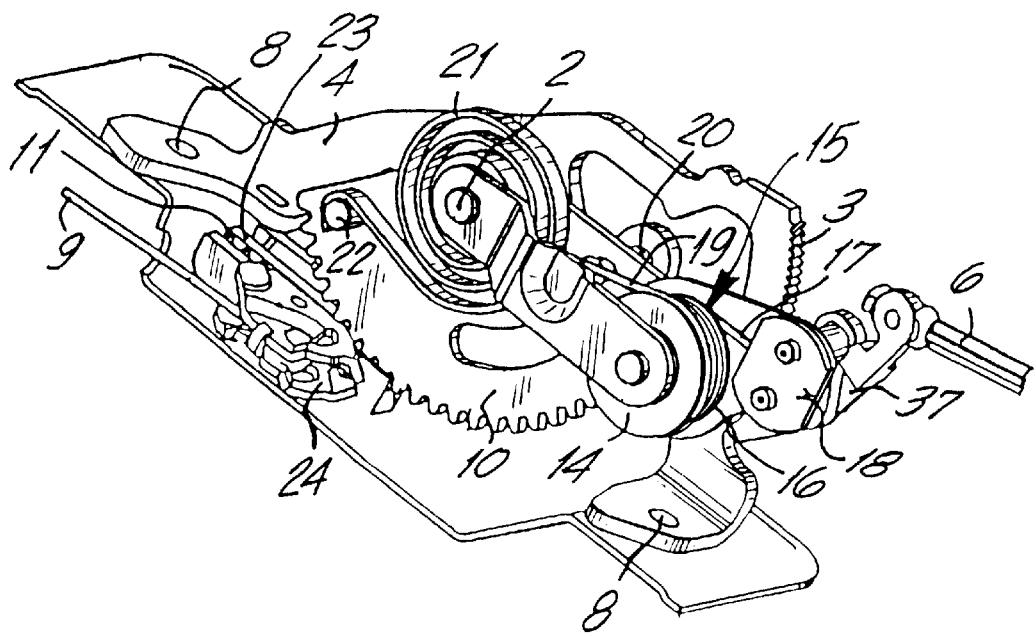
FIG. 5 shows a perspective view of another portion of the hand brake shown in FIG. 2 at an increased scale.
Figure 4:
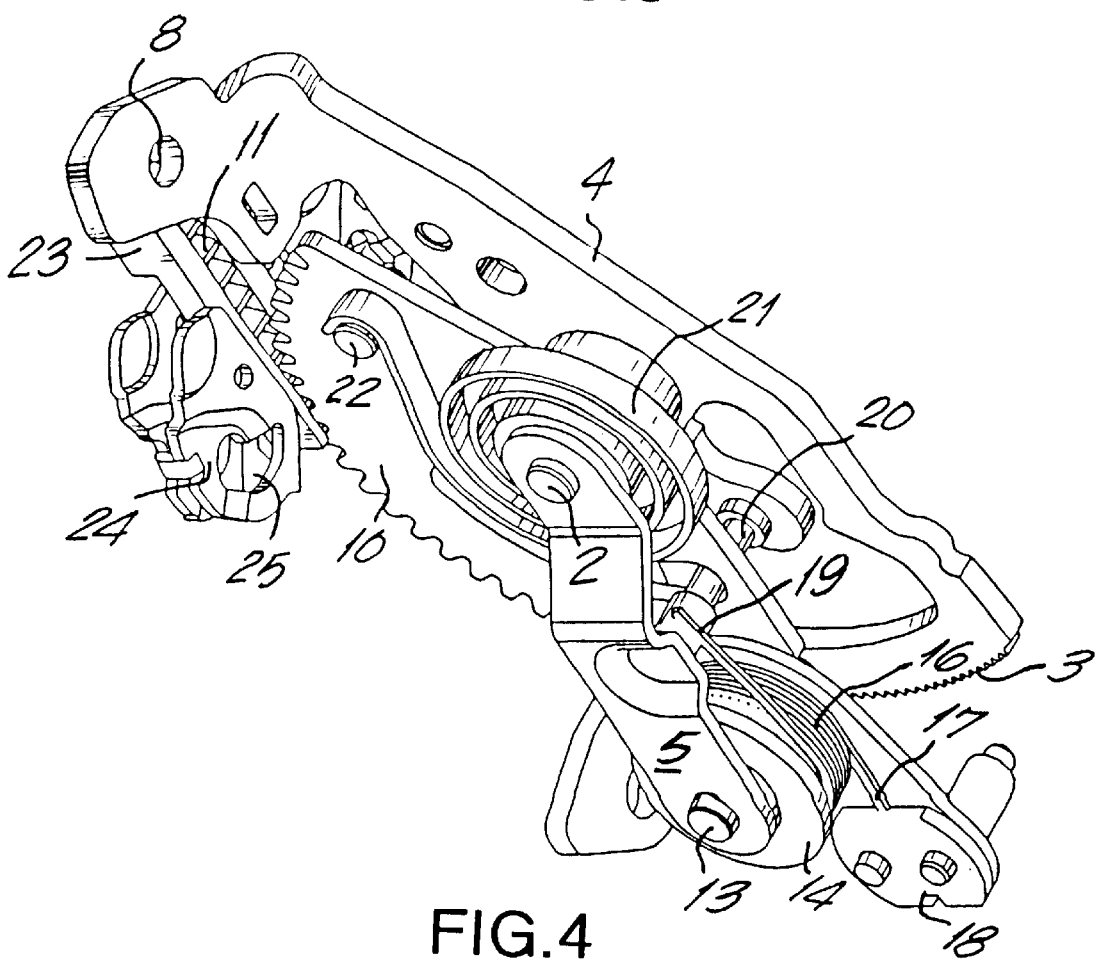
FIG. 4 shows a perspective view of a portion of the hand brake shown in FIG. 2 at an increased scale.

The tooth rack 11 is loosely supported in the body pan 7, primarily for a longitudinal displacement, and extends in the same direction as the tooth segment 10. The tooth rack 11 is also displaceable, to a limited extent, circumferentially by a web 23 which cooperates with the tooth segment 10. The tooth rack 11 has a projection 24 to which the at least brake cable 9 is connected. As it is common in the field of hand brakes, the tooth rack 11 forms a connector for a second brake cable. In this case, the tooth rack 11 is formed as a distributor. The tooth rack 11 is supported in the body pan 7 for a pivotal movement about a vertical axle in a certain angular range, in particular, within an angular range of 150. As can be seen in FIG. 5, the side projection 24 of the tooth rack 11 is provided with engagement recesses 25 for receiving end portions of the brake cables 9 which are not shown in detail.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A hand brake for motor vehicles, comprising:

a trestle provided with a toothing;

a brake lever pivotally supported on the trestle;

locking ratchet means for retaining the brake lever on the trestle in an arbitrary selected pull position;

at least one brake cable;

a connector for connecting the at least one brake cable with the trestle;

means supported on the trestle for tensioning the at least one brake cable;

a spring for applying a biasing force to the tensioning means in a rotational direction;

means for connecting the brake lever with the brake cable tensioning means; and means for applying a biasing force to the connecting means, wherein the tensioning means is formed as a tooth member constantly formlockingly connected with the brake lever and the brake cable connector.

2. A hand brake as set forth in claim 1, wherein the connecting means comprises a pinion supported on the brake lever and engaging the tooth member for connecting the tooth member with the brake lever.

3. A hand brake as set forth in claim 2, further comprising steplessly operating blocking means which cooperates with the pinion dependent on pivotal movement of the brake lever to provide for a positive connection of the one of tooth segment and tooth wheel with the brake lever.

4. A hand brake as set forth in claim 3, wherein the locking means comprises a peg secured on the trestle and providing for a rotational movement of the pinion, and a wrap spring supported on a roller connected with the pinion for joint rotation therewith, the wrap spring having one radial projection thereof clampingly attached to the brake lever and having another radial projection thereof cooperating with the peg which, upon lifting the another radial projection of the wrap spring, causes rotational movement of the pinion.

5. A hand brake as set forth in claim 1, wherein the connector for the at least one brake cable comprises a tooth rack loosely arranged in a body pan and engaging the tooth member from beneath.

6. A hand brake as set forth in claim 4, wherein the body pan also supports the trestle.

7. A hand brake as set forth in claim 4, wherein the tooth rack has a sidewisely extending projection connected with the at least one brake cable.

8. A hand brake as set forth in claim 1, wherein the member tooth includes a transversely extending peg, and wherein the spring is formed as a helical spring supported against the brake lever and having one end thereof engaging the transversely extending peg.

* * * * *